UNITED STATES PATENT OFFICE.

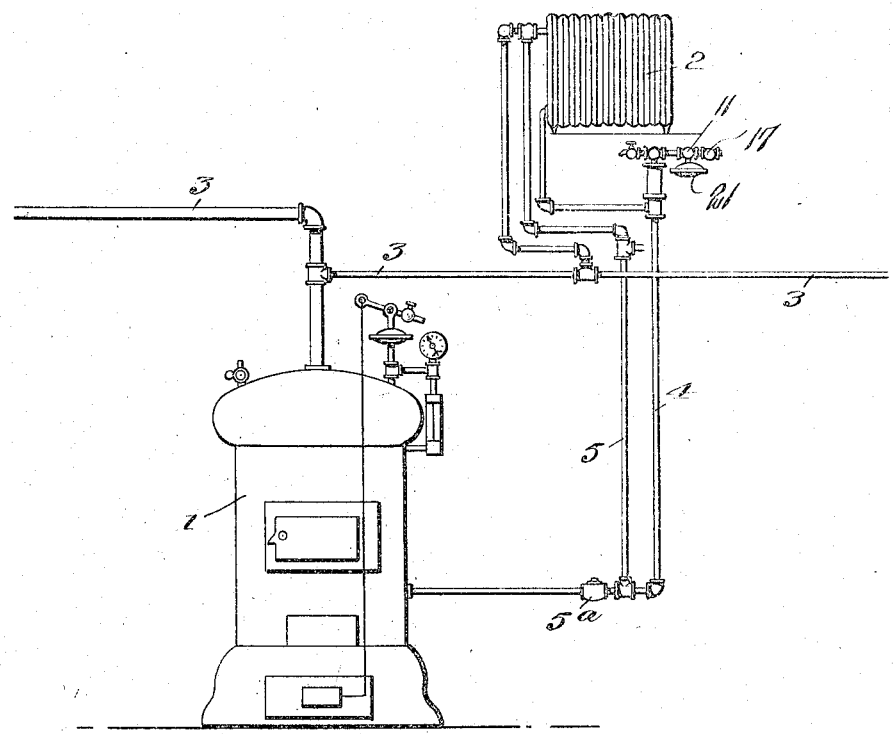

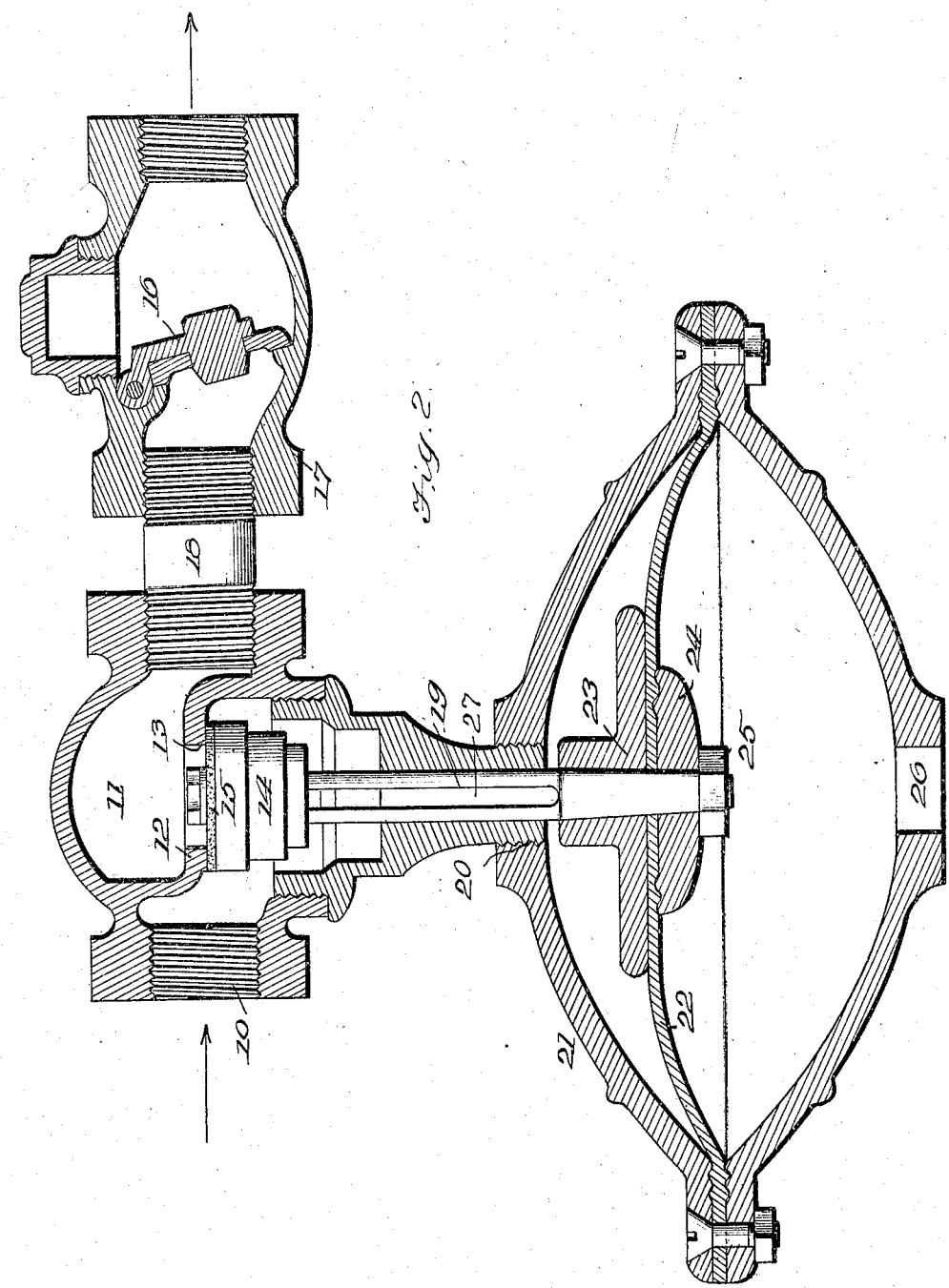

FRANK SHURTLEFF, OF MOLINE, ILLINOIS, ASSIGNOR OF ONE-HALF TO MOLINE VACUUM-VAPOR HEATING COMPANY, A CORPORATION OF ILLINOIS.

VACUUM-VALVE FOR HEATING SYSTEMS.

No. 930,893.  Specification of Letters Patent.  Patented Aug. 10, 1909.

Application filed March 25, 1908. Serial No. 423,163.

*To all whom it may concern:*

Be it known that I, FRANK SHURTLEFF, a citizen of the United States, residing at Moline, in the county of Rock Island and State of Illinois, have invented a new and useful Improvement in Vacuum-Valves for Heating-Systems, of which the following is a specification.

This invention is an improved valve or combination of valves for maintaining a partial vacuum in a heating system. It is capable of use with any vacuum heating system or other apparatus where it is desired to prevent the return of air after it has been expelled.

It is well known to those familiar with apparatus of the kind mentioned that an ordinary check valve will not hold tight enough to prevent air entering a space in which a vacuum or partial vacuum is formed, this defect being incident to the small area for the air pressure to act on, as well as to uneven or hard valve seats or surfaces. To remedy this defect I provide a diaphragm valve, the diaphragm being subject on one side to the pressure within the heating system and on the other side to the pressure of the atmosphere; and an auxiliary check valve is used to initially produce a slight vacuum which enables the diaphragm valve to close, after which it remains closed while the system remains below atmospheric pressure, and in consequence of the large surface of the diaphragm the valve is pressed against its seat hard enough to make it absolutely air tight.

The invention is illustrated in the accompanying drawings in which—

Figure 1 is a diagrammatic view of the system, and Fig. 2 is a sectional view of the valve.

The system shown in Fig. 1 comprises a heater 1, and a plurality of radiators 2, the radiators being connected with the heater by a supply pipe 3, and a return pipe 4. The radiators are also provided with an air pipe 5 which leads from the upper part of the radiator to the return pipe 4, said pipe opening on the outer side of the check valve 5ª.

The valve is connected to the system or apparatus at 10, which is an inlet to a valve casing 11 having a diaphragm 12 with valve seat 13 therein. The valve 14 closes against this seat, and it is fitted with a rubber or soft composition disk 15 which insures a tight joint when closed. The outlet from the casing on the other side of the diaphragm is through a check valve 16 the casing 17 of which is connected to the casing 11 by a short pipe 18. The check valve opens to the atmosphere.

The valve 14 is carried at the upper end of a stem 19 which works through a bonnet 20 in the bottom of the casing and which is connected to the casing 21 containing the flexible diaphragm 22, to which the valve stem is fastened by washers 23 and 24 and nut 25. The diaphragm is open underneath to the atmosphere by means of a hole 26 in the casing and it is subject to the vacuum above by means of a slot 27 in the valve stem, allowing communication between the diaphragm casing and the system in which the vacuum is to be produced.

Normally, that is when the system is at or above atmospheric pressure the diaphragm valve remains open by gravity or by the pressure within, and air is expelled through the check valve. When the vacuum is produced within the system the check valve first closes which establishes a partial vacuum above the diaphragm and permits the air pressure thereunder to lift the same and tightly close the valve 14, which remains closed while the condition of vacuum exists. The passage to the check valve is closed, and no leak therethrough is induced, and return of air is impossible. It is obvious that the check valve is essential to produce the partial vacuum necessary to close the diaphragm valve.

I claim:

1. In a heating system the combination with the return conduit, of a valve casing establishing communication between the return conduit and the atmosphere, a check valve within said casing, a second valve casing arranged between the first valve casing and the system and provided with a bonnet, a diaphragm casing connected with said bonnet and a diaphragm in the casing, a stem connected with the diaphragm and extending thence through the bonnet and having a passage forming communication between one side of the diaphragm and said second valve casing, the other side of the diaphragm being in communication with the atmosphere, a diaphragm valve in said second casing and supported on the diaphragm stem on the opposite side of the bonnet from the diaphragm, and closing in a direction toward the check valve and the latter being arranged to close toward the diaphragm valve and connections between the check valve casing and the diaphragm valve casing all substantially as described, whereby when the system is at or above atmospheric pressure, the diaphragm valve will be opened to permit the expulsion of air through the check valve and when a vacuum is produced within the system the check valve will close establishing a partial vacuum above the diaphragm to permit the normal air pressure to operate the diaphragm to close its valve, all substantially as set forth.

2. In a heating system provided with an outlet, a valve controlling the outlet, a diaphragm connected to said valve and having one side thereof in communication with the heating system and the other side with the atmosphere whereby to close the outlet when the pressure in the system falls below that of the atmosphere, and a check valve between the said valve and the outlet and arranged to close toward the heating system, for the purpose set forth.

FRANK SHURTLEFF.

Witnesses:
GUSTAVUS A. SHALLBEY,
HERMAN W. NELSON.